United States Patent
Mahiddini et al.

(10) Patent No.: US 9,980,104 B2
(45) Date of Patent: May 22, 2018

(54) SAFE HANDLING OF TEXT MESSAGES

(71) Applicant: Alcatel Lucent, Boulone Billancourt (FR)

(72) Inventors: Patrice Mahiddini, Nozay (FR); Corinne Sayag, Nozay (FR); Dominique Rondeau, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days. days.

(21) Appl. No.: 15/129,048

(22) PCT Filed: Mar. 13, 2015

(86) PCT No.: PCT/EP2015/055332
§ 371 (c)(1),
(2) Date: Sep. 26, 2016

(87) PCT Pub. No.: WO2015/144462
PCT Pub. Date: Oct. 1, 2015

(65) Prior Publication Data
US 2017/0111774 A1    Apr. 20, 2017

(30) Foreign Application Priority Data
Mar. 26, 2014 (EP) .................................. 14305428

(51) Int. Cl.
*H04W 36/00* (2009.01)
*H04W 4/12* (2009.01)
*H04W 4/04* (2009.01)

(52) U.S. Cl.
CPC ............. *H04W 4/12* (2013.01); *H04W 4/046* (2013.01); *H04M 2201/39* (2013.01); *H04M 2201/60* (2013.01)

(58) Field of Classification Search
CPC ... H04W 4/12; H04W 4/046; H04M 2201/39; H04M 2201/60; H04M 3/523;
(Continued)

(56) References Cited

U.S. PATENT DOCUMENTS

2005/0232225 A1* 10/2005 Pelaez ............... H04L 29/12594
370/351
2011/0300833 A1    12/2011 Shaw
2012/0157113 A1*  6/2012 Brisebois .................. G01S 5/00
455/456.1

FOREIGN PATENT DOCUMENTS

JP    2007-193545 A    8/2007
JP    2009-272984 A    11/2009
(Continued)

OTHER PUBLICATIONS

International Search Report for PCT/EP2015/055332 dated Jun. 8, 2015.

*Primary Examiner* — Phuoc H Doan
(74) *Attorney, Agent, or Firm* — Fay Sharpe, LLP

(57) ABSTRACT

For a safe handling of text messages (MesT) received by a communication device (CD) owned by a user, an application server (AS) receives a request (Req) from the communication device (CD), the request containing an identifier (IdCD) of the communication device and presence data (DatP) indicating that the communication device is associated with a service entity (SE) via a wireless session, the service entity (SE) being a vehicle, receives a text message (MesT) having the user as recipient, and sends a message (MesC) to a network server (NS), the message (MesC) including at least a part of the content of the text message (MesT), the network server (NS) generating a voice message (MesV) from the content of the message (MesC) and providing the voice message (MesV) via an audio call to the communication device (CD).

14 Claims, 2 Drawing Sheets

(58) Field of Classification Search
CPC .......... H04M 3/5233; G06Q 10/06395; H04L 9/3273; H04L 63/10; H04L 65/403
USPC ................ 455/456.1; 370/351; 705/14.64; 379/265.1
See application file for complete search history.

(56) References Cited

FOREIGN PATENT DOCUMENTS

| | | |
|---|---|---|
| JP | 2012-123228 A | 6/2012 |
| KR | 10-2005-0121314 | 12/2005 |
| WO | WO 2011/029862 A1 | 3/2011 |

\* cited by examiner

SAFE HANDLING OF TEXT MESSAGES

FIELD OF THE INVENTION

The present invention pertains to the handling of text messages. More particularly, the invention relates to a system for handling text messages in a safe way in moving vehicles like cars.

BACKGROUND

A big number of car accidents occur because of people reading their text message while driving their car. If the safest solution remains to stop the car before reading the message, it is not always possible and some urgent messages need to be delivered as soon as possible. Most of the recent cars are equipped with Bluetooth kits that allow taking a call from a command on the steering wheel.

Current solutions are located on the client side. They are specific to some car manufacturers and are only available on some cars' models as an extra option for which the user has to pay extra money.

There is a need to improve safety of users receiving text messages while driving vehicles.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for a safe handling of text messages received by a communication device) owned by a user, comprising the following steps in an application server:

receiving a request from the communication device, the request containing an identifier of the communication device and presence data indicating that the communication device is associated with a service entity via a wireless session, the service entity being a vehicle, receiving a text message having the user as recipient, sending a message to a network server, the message including at least a part of the content of the text message, the network server generating a voice message from the content of the message and providing the voice message via an audio call to the communication device.

Advantageously, the invention provides a solution to provide service providers with a solution to automatically transform every incoming text message toward a driving subscriber into a Text To Speech phone call. Then the user can safely handle the call and listen to the message while keeping his/her hands on the steering wheel and his/her eyes on the road.

It is possible for a service firm, like a bank, to increase the probability for one of its customer to receive an important message in the following minutes, whatever the customer is driving or not.

In an embodiment, before receiving the text message having the user as recipient, the text message is intercepted by a node of the telecommunication network and forwarded to the application server.

In an embodiment, before receiving the text message having the user as recipient, the text message is received by the communication device and forwarded to the application server.

In an embodiment, after the reception of the request from the communication device, the application server sends a notification to a presence server, the notification containing the identifier of the communication device and the presence data in order that the presence server updates location information of the user by means of the identifier of the communication device and the presence data, meaning that the user is located inside the service entity.

In an embodiment, after the reception of the text message having the user as recipient, the application server interrogates the presence server to check whether the communication device is associated with a service entity via a wireless session.

In an embodiment, the service entity is a motorized vehicle able to be driven by the user.

In an embodiment, the service entity is one of a car, a truck, a motorcycle, a train and a plane.

In an embodiment, the text message is one of a short message, a mail, an instant message, and a notification from an application.

In an embodiment, the text message is received by a dedicated web service of an Application Programming Interface gateway connected to the application server.

In an embodiment, the network server is included in an IP Multimedia Subsystem (IMS) network.

In an embodiment, the communication device is associated with a service entity via a protocol among Digital Living Network Alliance protocol, Bluetooth protocol, Near Field Communication protocol, and Radio-Frequency Identification protocol.

In an embodiment, the application server receives another request from the communication device after that the communication device is disconnected from the service entity, the request containing the identifier of the communication device and presence data indicating that the communication device is not associated anymore with the service entity via a wireless session.

The invention also pertains to a server for application server for a safe handling of text messages received by a communication device owned by a user, comprising:

means for receiving a request from the communication device, the request containing an identifier of the communication device and presence data indicating that the communication device is associated with a service entity via a wireless session, the service entity being a vehicle, means for receiving a text message having the user as recipient, means for sending a message to a network server, the message including at least a part of the content of the text message, the network server generating a voice message from the content of the message and providing the voice message via an audio call to the communication device.

The invention also pertains to computer program capable of being implemented within a server, said program comprising instructions which, when the program is executed within said server, carry out steps according to the method according to the invention.

BRIEF DESCRIPTION OF THE FIGURES

Some embodiments of the present invention are now described, by way of example only, and with reference to the accompanying drawings. The same reference number represents the same element or the same type of element on all drawings.

The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
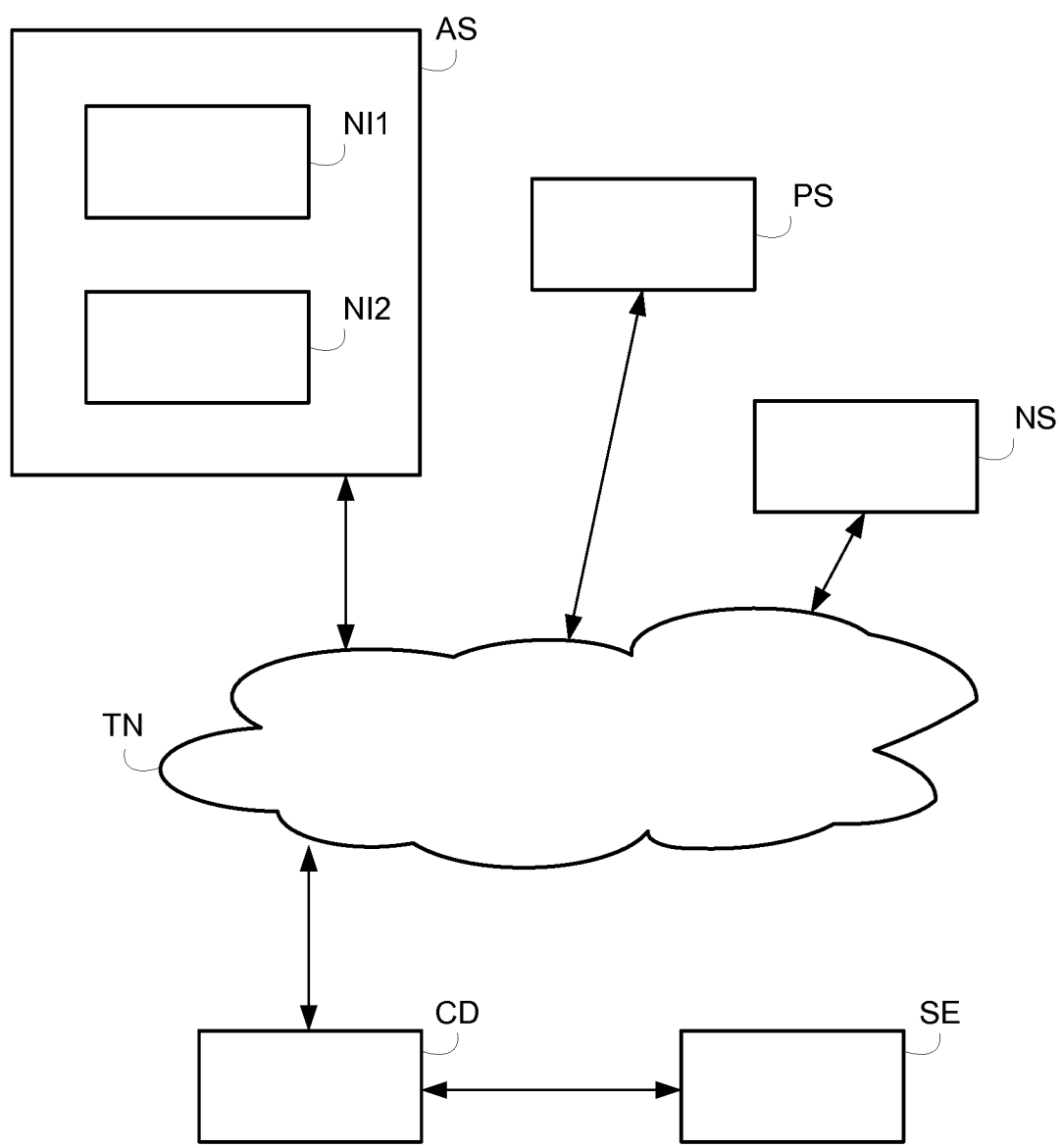
FIG. 1 is a schematic block diagram of a communication system according to one embodiment of the invention for a safe handling of text messages.

Referring to FIG. 1, a communication system comprises an application server AS, a presence server PS, a network server NS and a communication device CD which are able to communicate between them through at least a telecommunication network TN, and a service entity SE able to communicate with the communication device CD through a wireless network.

For example, the telecommunication network TN is a digital cellular radio communication network of the GSM (Global System for Mobile communications) or UMTS (Universal Mobile Telecommunications System) or even CDMA (Code Division Multiple Access) type or even LTE (Long Term Evolution) type. The GSM type network may be coupled with a GPRS (General Packet Radio Service) network for the transmission of data by packets with mobility and access management via radio.

The telecommunication network TN can be associated with a packet network, for example, an IP ("Internet Protocol") high-speed network such as the Internet or an intranet, or even a company-specific private network.

According to one embodiment of the invention that will be referred to throughout the remainder of the description, the telecommunication network TN comprises a packet network, for example, an IP ("Internet Protocol") high-speed network such as the Internet or an intranet, or even a company-specific private network. The packet network is connected to an IP Multimedia Subsystem (IMS) network.

The control of a communication related to the communication device is performed within the IMS network, particularly by three Call State Control Function (CSCF) control entities: the entities Proxy CSCF (P-CSCF), Interrogating CSCF (I-CSCF), and Serving-CSCF (S-CSCF).

The entity P-CSCF is the first point of contact in the IMS network, and its address is discovered by the user terminal when a Packet Data Protocol (PDP) context is activated to exchange SIP messages.

The network server NS is included in the IMS network and manages at least some of the call state control functions, in particular the P-CSCF function.

In one embodiment, the network server NS implements a Converged Telephony Server (CTS) that is a IMS compliant telephony application server that provides consumer, business and converged services to SIP (Session Initiation Protocol), IP and legacy fixed and wireless subscribers.

In one embodiment, the network server NS implements a Media Resource Function (MRF) that provides media related functions such as media manipulation (e.g. voice stream mixing) and playing of tones and announcements.

In one embodiment, the network server NS implements a Text To Speech application that converts normal language text into speech.

In one variant, the Converged Telephony Server (CTS), the Media Resource Function (MRF) and Text To Speech application are implemented in different network servers included in the IMS network.

The presence server PS is included in the IMS network and manages a database storing information about connectivity of communication services, for example pairing information of communication devices.

The presence server PS is part of a Rich Communication Suite (RCS) that uses the capabilities of IMS core system as the underlying service platform taking care of issues such as authentication, authorization, registration, charging and routing.

The application server AS is an API (Application Programming Interface) gateway, and may use open standard applications such as HTTP (Hypertext Transfer Protocol), SOAP (Simple Object Access Protocol) and REST (Representational state transfer).

In another embodiment, the application server AS acts as or may take advantage of an API gateway connected to application server AS to access IMS network services.

An Application Programming Interface (API) is a specification that defines an interface for software components to communicate with each other. An API may include specifications for functions, data structures, object classes, and variables. Some examples of API specifications include the standard template library in C++, the Microsoft Windows API, libraries in C, and the Java API. When an API specifies a function, the API provides information about how the function is called, what parameters are included in calling the function, and the format and type of data returned by the function.

For example, the application server AS identifies and deploys code objects to implement web services.

The application server AS comprises a first network interface NI1 and a second network interface NI2.

The first network interface NI1 comprises a first set of application programming interfaces to communicate with applications developed and used by the communication device.

The second network interface NI2 comprises a second set of application programming interfaces to communicate with applications on the side of the IMS network, especially with the presence server PS and the network server NS.

For example, the first network interface NI1 implements web services that are exposed REST web services.

In one embodiment, the first network interface NI1 implements three web services.

A first web service, called "SETINCAR" service, updates the user's location information in the database of the presence server PS indicating the presence of the user in a vehicle.

A second web service, called "SETNOTINCAR" service, updates the user's location information in the database of the presence server PS indicating the absence of the user in a vehicle.

The user's location information is deduced from a message received from the communication device CD.

A third web service, called "SAFETEXTMSG" service, interrogates the presence server PS to check if the user is located in his/her car.

The communication device CD can be a personal computer or a laptop, an electronic tablet, a smart phone, a personal digital assistant, a tablet, for instance. More generally it concerns any type of electronic equipment comprising a communication module, capable of establishing connection with the telecommunication network to exchange data such as messages with other communication equipments.

The service entity SE can be a vehicle that is driven by a user owning the communication device CD. The service entity SE is capable of establishing connection with the communication device CD through a wireless network.

For example, the vehicle is a motorized vehicle like a car, a truck, a motorcycle, a train, a plane or can be any vehicle driven by a user owning the communication device, or can be a bicycle.

In an embodiment, the communication device CD and the service entity SE can be connected under a communication session established via at least one of the communication protocols among Digital Living Network Alliance (DLNA) protocol, Bluetooth protocol, Near field communication (NFC) protocol, and Radio-frequency identification (RFID) protocol.

The communication device CD implements an application that detects that the communication device is paired with the service entity, via Bluetooth for example.

Figure 2:
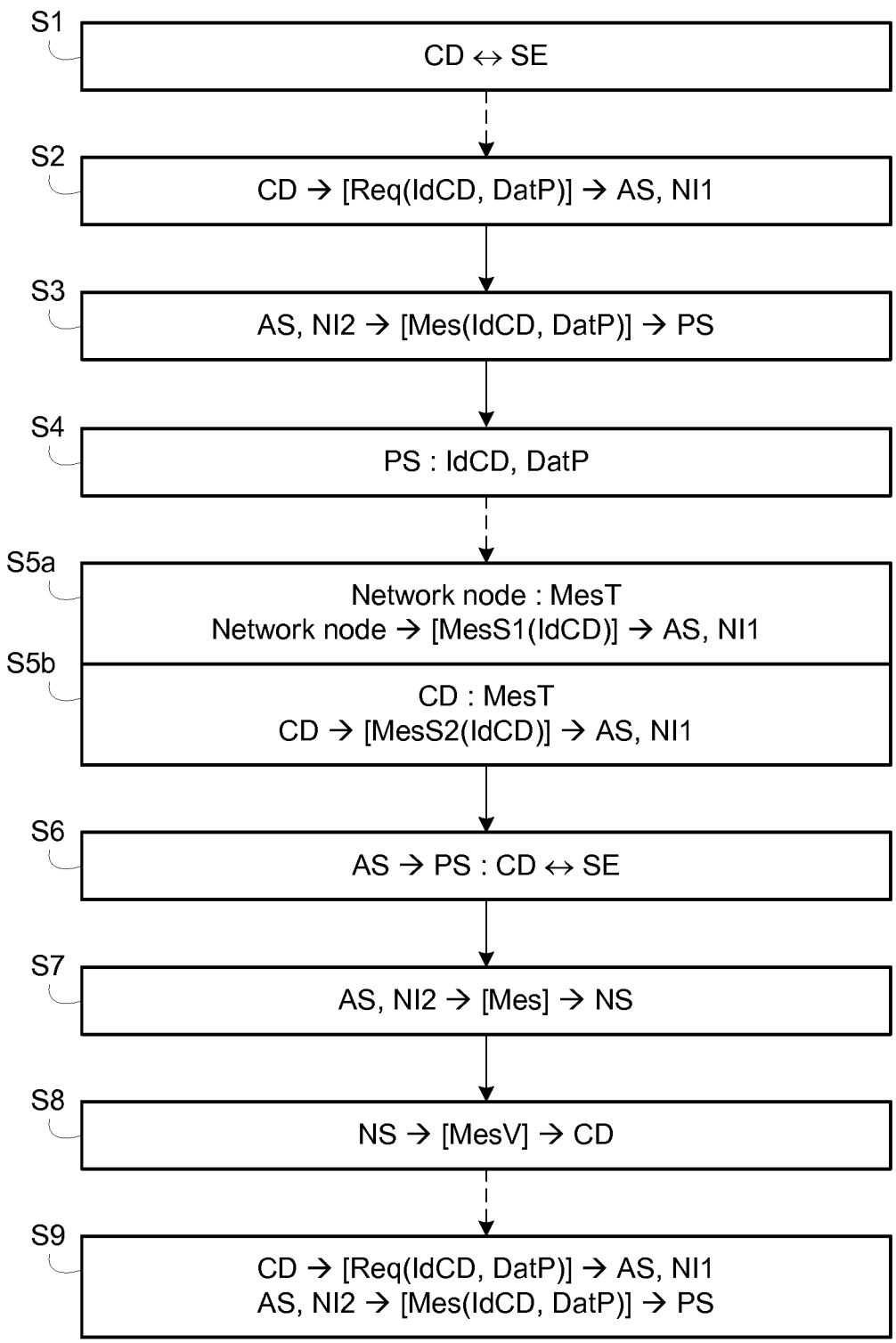
FIG. 2 is a flow chart illustrating a method for a safe handling of text messages according to one embodiment of the invention.

With reference to FIG. 2, a method for a safe handling of text messages according to one embodiment of the invention comprises steps S1 to S9 executed within the communication system.

In step S1, the user owning the communication device CD accesses his/her service entity SE, like a car. The communication device CD establishes a wireless connection with the service entity SE, via Bluetooth for example, in order to pair the communication device CD with the service entity SE.

In step S2, the application in the communication device CD detects that the communication device CD is paired with the service entity SE and sends a request Req to the first network interface NI1 of the application server AS.

The request Req is for example a HTTP request, and is sent towards a dedicated web service of the first network interface NI1, called "SETINCAR" service for example.

The request Req contains an identifier IdCD of the communication device CD and presence data DatP containing information about the pairing of the communication device CD with the service entity SE. In other words, the presence data DatP indicate that the communication device CD is associated with the service entity SE via a wireless session.

For example, the identifier IdCD of the communication device CD is a call number or a MSISDN (Mobile Subscriber Integrated Services Digital Network-Number) of the communication device CD.

In step S3, the first network interface NI1 sends a notification Not to the presence server PS, via the second interface NI2, the notification Not containing the identifier IdCD of the communication device CD and the presence data DatP.

In step S4, the presence server PS updates the user's location information in the database by means of the identifier IdCD of the communication device CD and the presence data DatP, meaning that the user is located near or inside the service entity SE.

In step S5, a text message MesT having the user as recipient is received by the first interface NI1 of the application server AS. The text message is received by a dedicated web service of the first network interface NI1, called "SAFETEXTMSG" service for example.

The text message MesT can be of any nature, like a short message SMS, a mail, an instant message, or a notification from an application for example related to a social network service.

In a first embodiment in step S5a, a network node of the telecommunication network TN intercepts the message.

For example, if the text message MesT is a SMS, a SMS gateway intercepts the message.

For example, if the text message MesT is a mail, a mail proxy server intercepts the message.

For example, if the text message MesT is an instant message, an instant messaging proxy server intercepts the message.

It is assumed that the network node stores the identifier IdCD of the communication device in correspondence with a set of identifiers of the user.

The network node sends a service message MesS1 to the application server AS, the service message MesS1 including the identifier IdCD of the communication device and the content of the text of the text message MesT.

In a second embodiment in step S5b, the text message MesT is received by the communication device CD and the application detects the reception of the text message MesT.

The application sends a service message MesS2 to the application server AS, the service message MesS2 containing the identifier IdCD of the communication device and the content of the text of the text message MesT.

In step S6, the application server AS interrogates the presence server PS via the second interface NI2 to check if the communication device CD of the user is paired with a service entity SE, i.e. if the user is located in his/her car. In other words, the application server AS checks if the communication device CD is associated with a service entity SE via a wireless session.

To this end, the application server AS can send a command containing the identifier IdCD of the communication device CD to the presence server PS.

In step S7, if the presence server PS informs the application server AS that the communication device CD of the user is paired with a service entity SE, the second interface NI2 of the application server AS sends a command message MesC to the network server NS to invoke a Text To Speech function.

The command message MesC includes the content of the text of the text message MesT.

In step S8, the Text To Speech function of the network server NS generates a voice message MesV from the content of the text.

The network server NS performs then an audio call to the communication device CD, through the Converged Telephony Server (CTS) and the Media Resource Function (MRF) for example and provides the voice message MesV via the audio call.

For example, the voice message is formatted in file of "way" type that can be played by a vocal function of the network server NS.

The user can then listen to the voice message MesV by using the communication device CD.

In step S9, the communication device CD disconnects from the service entity SE, and is unpaired with the service entity SE.

The application in the communication device CD detects that the communication device CD is not paired anymore with the service entity SE.

The application sends a request to the first network interface NI1 of the application server AS. The request is sent towards a dedicated web service of the first network interface NI1, called "SETNOTINCAR" service for example.

The request contains the identifier IdCD of the communication device CD and presence data DatP containing information about the disconnection of the communication device CD with the service entity SE.

The first network interface Nil sends a notification to the presence server PS, via the second interface NI2, the notification containing the identifier IdCD of the communication device CD and the presence data DatP.

The presence server PS updates then the user's location information in the database by means of the identifier IdCD of the communication device CD and the presence data DatP.

It is set that the user is not in his/her car anymore, thus all next incoming text messages are routed to the communication device CD as usual.

The invention described here relates to a method and a server for a safe handling of text messages. According to one implementation of the invention, steps of the invention are determined by the instructions of a computer program incorporated into a server, such as the application server. The program comprises program instructions which, when said program is loaded and executed within the server, carry out the steps of the method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the method according to the invention.

The invention claimed is:

1. A method for a safe handling of text messages received by a communication device owned by a user, comprising the following in an application server:
    receiving a request from the communication device, the request containing an identifier of the communication device and presence data indicating that the communication device is associated with a service entity via a wireless session, the service entity being a vehicle,
    sending a notification to a presence server, the notification containing the identifier of the communication device and the presence data in order that the presence server updates location information of the user by means of the identifier of the communication device and the presence data,
    receiving a text message having the user as recipient, and
    sending a message to a network server, the message including at least a part of the content of the text message, the network server generating a voice message from the content of the message and providing the voice message via an audio call to the communication device.

2. A method according to claim 1, wherein before receiving the text message having the user as recipient, the text message is intercepted by a node of the telecommunication network and forwarded to the application server.

3. A method according to claim 1, wherein before receiving the text message having the user as recipient, the text message is received by the communication device and forwarded to the application server.

4. A method according to claim 1, wherein, after the reception of the text message having the user as recipient, the application server interrogates the presence server to check whether the communication device is associated with a service entity via a wireless session.

5. A method according to claim 1, wherein the service entity is a motorized vehicle able to be driven by the user.

6. A method according to claim 5, wherein the service entity is one of a car, a truck, a motorcycle, a train and a plane.

7. A method according to claim 1, wherein the text message is one of a short message, a mail, an instant message, and a notification from an application.

8. A method according to claim 1, wherein the text message is received by a dedicated web service of the application server.

9. A method according to claim 1, wherein the text message is received by a dedicated web service of an Application Programming Interface gateway connected to the application server.

10. A method according to claim 1, wherein the network server is included in an IP Multimedia Subsystem network.

11. A method according to claim 1, wherein the communication device is associated with the service entity via a protocol among Digital Living Network Alliance protocol, Bluetooth protocol, Near Field Communication protocol, and Radio-Frequency Identification protocol.

12. A method according to claim 1, wherein the application server receives another request from the communication device after that the communication device is disconnected from the service entity, the request containing the identifier of the communication device and presence data indicating that the communication device is not associated anymore with the service entity via a wireless session.

13. An application server for a safe handling of text messages received by a communication device owned by a user, said application server being operative to:
    receive a request from the communication device, the request containing an identifier of the communication device and presence data indicating that the communication device is associated with a service entity via a wireless session, the service entity being a vehicle,
    send a notification to a presence server, the notification containing the identifier of the communication device and the presence data in order that the presence server updates location information of the user by means of the identifier of the communication device and the presence data,
    receive a text message having the user as recipient, and
    send a message to a network server, the message including at least a part of the content of the text message, the network server generating a voice message from the content of the message and providing the voice message via an audio call to the communication device.

14. A non-transitory computer readable medium including a computer program capable of being implemented within an application server for a safe handling of text messages received by a communication device owned by a user, said program comprising instructions which, when the program is loaded and executed within said server, carry out the following:
    receiving a request from a communication device, the request containing an identifier of the communication device and presence data indicating that the communication device is associated with a service entity via a wireless session, the service entity being a vehicle, sending a notification to a presence server, the notification containing the identifier of the communication device and the presence data in order that the presence server updates location information of the user by means of the identifier of the communication device and the presence data, receiving a text message having the user as recipient, sending a message to a network server, the message including at least a part of the content of the text message, the network server generating a voice message from the content of the message and providing the voice message via an audio call to the communication device.

* * * * *